United States Patent
Suzuki et al.

(10) Patent No.: US 9,080,671 B2
(45) Date of Patent: Jul. 14, 2015

(54) CONTINUOUSLY-VARIABLE TRANSMISSION AND CONTINUOUSLY-VARIABLE TRANSMISSION CONTROL METHOD

(71) Applicant: JATCO LTD, Fuji-shi, Shizuoka (JP)

(72) Inventors: Hideaki Suzuki, Yokohama (JP); Yoshio Yasui, Machida (JP); Yuuji Nagase, Yokohama (JP); Fumito Shinohara, Mishima (JP)

(73) Assignee: JATCO LTD, Fuji-shi (JP)

( * ) Notice: Subject to any disclaimer, the term of this patent is extended or adjusted under 35 U.S.C. 154(b) by 0 days.

(21) Appl. No.: 14/364,591

(22) PCT Filed: Nov. 12, 2012

(86) PCT No.: PCT/JP2012/079257
§ 371 (c)(1),
(2) Date: Jun. 11, 2014

(87) PCT Pub. No.: WO2013/008880
PCT Pub. Date: Jun. 20, 2013

(65) Prior Publication Data
US 2014/0343810 A1    Nov. 20, 2014

(30) Foreign Application Priority Data

Dec. 13, 2011 (JP) ................................. 2011-271981

(51) Int. Cl.
*F16H 61/66* (2006.01)
*F16H 61/02* (2006.01)
(Continued)

(52) U.S. Cl.
CPC ............ *F16H 61/66* (2013.01); *F16H 61/0265* (2013.01); *F16H 61/66259* (2013.01); *F16H 61/66272* (2013.01); *F16H 2061/0075* (2013.01)

(58) Field of Classification Search
USPC .......................................... 701/51, 58, 60, 66
See application file for complete search history.

(56) References Cited

U.S. PATENT DOCUMENTS

2001/0023217 A1    9/2001   Miyagawa et al.
2004/0116245 A1    6/2004   Yamamoto et al.
(Continued)

FOREIGN PATENT DOCUMENTS

JP    2001-263474 A    9/2001
JP    2001-324001 A    11/2001
(Continued)

*Primary Examiner* — Edwin A Young
(74) *Attorney, Agent, or Firm* — Foley & Lardner LLP

(57) ABSTRACT

A first determining unit configured to determine whether the indicated pressure of a primary pulley pressure has become a line pressure during an up shift, an indicated pressure control unit configured to make the indicated pressure of the primary pulley pressure alone higher than the line pressure when the target shift rate is determined to be equal to or lower than a predetermined shift rate and the speed ratio is determined not to have become the target speed ratio, and an estimated time detecting unit configured to detect a predetermined time it takes until the primary pulley pressure can be regarded as being equal to the line pressure after the target shift rate is determined to be equal to or lower than the predetermined shift rate, and the indicated pressure of the primary pulley pressure is made higher than the line pressure, are provided, and the indicated pressure control unit is configured to calculate the deviation between the indicated pressure of the primary pulley pressure and indicated pressure of the line pressure after the estimated predetermined time is over, and control transmission of a continuously-variable transmission while maintaining the deviation after the predetermined time is over.

6 Claims, 5 Drawing Sheets

(51) Int. Cl.
*F16H 61/662* (2006.01)
*F16H 61/00* (2006.01)

(56) References Cited

U.S. PATENT DOCUMENTS

2006/0073924 A1 4/2006 Izumi et al.
2008/0119308 A1* 5/2008 Iwasa et al. .................... 474/70
2010/0137100 A1* 6/2010 Kojima et al. .................. 477/38
2010/0318270 A1* 12/2010 Yamanaka et al. ............. 701/58
2011/0015833 A1* 1/2011 Urata et al. ..................... 701/51

FOREIGN PATENT DOCUMENTS

| JP | 2004-100736 A | 4/2004 |
| JP | 2004-100737 A | 4/2004 |
| JP | 2006-105270 A | 4/2006 |

* cited by examiner

CONTINUOUSLY-VARIABLE TRANSMISSION AND CONTINUOUSLY-VARIABLE TRANSMISSION CONTROL METHOD

TECHNICAL FIELD

The present invention relates to a continuously-variable transmission and a method of controlling a continuously-variable transmission.

BACKGROUND ART

A belt-type continuously-variable transmission, which is formed by mounting a belt between a primary pulley and a secondary pulley, achieves continuously variable transmission by changing the balance between the primary pulley pressure and the secondary pulley pressure. The continuously-variable transmission achieves shift to the high side by gradually increasing the primary pulley pressure upon a shift up.

Conventionally, as disclosed in JP2001-324001A, a line pressure that is given by adjusting a pump discharge pressure produced by an oil pump, using a line pressure control valve, is used as a secondary pulley pressure, and the line pressure is adjusted with a primary pulley control valve as a primary pulley pressure and supplied to a primary pulley.

SUMMARY OF INVENTION

With the above continuously-variable transmission, the primary pulley pressure does not become higher than the line pressure, and, when the primary pulley pressure becomes equal to the line pressure, the speed ratio assumes a predetermined speed ratio, for example, the highest speed ratio. Consequently, the indicated pressure of the primary pulley pressure may be made equal to or lower than the indicated pressure of the line pressure.

With a continuously-variable transmission, cases might occur where, due to variation of oil pressure, the actual pressure of the primary pulley pressure is lower than the indicated pressure of the primary pulley pressure.

Even in cases like this, a continuously-variable transmission with a primary pulley pressure sensor is able to make the speed ratio a predetermined speed ratio, by increasing the indicated pressure of the primary pulley pressure such that the actual pressure of the primary pulley pressure becomes equal to the line pressure, based on the signal from the primary pulley pressure sensor.

However, a continuously-variable transmission without a primary pulley pressure sensor is unable to detect the actual pressure of the primary pulley pressure, and even if this is a continuously-variable transmission in which the actual pressure of the primary pulley pressure is lower than the indicated pressure of the primary pulley pressure due to variation of oil pressure, as long as the indicated pressure of the primary pulley pressure is equal to or lower than the indicated pressure of the line pressure, it is not possible to make the speed ratio a predetermined speed ratio adequately.

The present invention has been made in order to solve problems like this, and it is therefore an object of the present invention to achieve making the speed ratio a predetermined speed ratio adequately even with a continuously-variable transmission which does not have a primary pulley pressure sensor and in which the actual pressure of the primary pulley pressure is lower than the indicated pressure of the primary pulley pressure due to variation of oil pressure.

A continuously-variable transmission according to one example of the present invention is a continuously-variable transmission which uses a secondary pulley pressure as a line pressure, and which adjusts the line pressure to a primary pulley pressure, and this continuously-variable transmission has: first determining means configured to determine whether an indicated pressure of the primary pulley pressure has become the line pressure during an up shift; second determining means configured to determine whether a target shift rate of the continuously-variable transmission has achieved a predetermined shift rate; indicated pressure control means configured to make the indicated pressure of the primary pulley pressure alone higher than the line pressure when the target shift rate is determined to be equal to or lower than the predetermined shift rate by the second determining means, and, upon deciding whether a speed ratio of the continuously-variable transmission has become a target speed ratio, the speed ratio is determined not to have become the target speed ratio, and estimated time detecting means configured to detect a predetermined time it takes until the primary pulley pressure can be regarded as being equal to the line pressure after the target shift rate is determined to be equal to or lower than the predetermined shift rate by the second determining means, and the indicated pressure of the primary pulley pressure is made higher than the line pressure by the indicated pressure control means, and the indicated pressure control means is configured to calculate a deviation between the indicated pressure of the primary pulley pressure and indicated pressure of the line pressure after the predetermined time detected by the estimated time detecting means is over, and control transmission of the continuously-variable transmission while maintaining the deviation after the predetermined time is over.

A method of controlling a continuously-variable transmission according to another example of the present invention is a continuously-variable transmission control method to control a continuously-variable transmission which uses a secondary pulley pressure as a line pressure, and which adjusts the line pressure to a primary pulley pressure, and this continuously-variable transmission control method includes: during an up shift, determining whether an indicated pressure of the primary pulley pressure has become the line pressure; determining whether a target shift rate of the continuously-variable transmission has achieved a predetermined shift rate; when the target shift rate is determined to be equal to or lower than the predetermined shift rate, and, upon deciding whether a speed ratio of the continuously-variable transmission has become a target speed ratio, the speed ratio is determined not to have become the target speed ratio, making the indicated pressure of the primary pulley pressure alone higher than the line pressure; when the target shift rate is determined to be equal to or lower than the predetermined shift rate, and, after the indicated pressure of the primary pulley pressure is made higher than the line pressure, detecting a predetermined time it takes until the primary pulley pressure can be regarded as being equal to the line pressure; calculating a deviation between the indicated pressure of the primary pulley pressure and indicated pressure of the line pressure after the predetermined time is over; and, after the predetermined time is over, controlling transmission of the continuously-variable transmission while maintaining the deviation.

According to these examples, even a continuously-variable transmission which does not have a primary pulley pressure sensor and in which the actual pressure of the primary pulley pressure is lower than the indicated pressure of the primary pulley pressure, is able to make the speed ratio a predetermined speed ratio adequately.

DESCRIPTION OF EMBODIMENTS

Now, an embodiment of the present invention will be described below with reference to the accompanying drawings. Note that, in the following description, the "speed ratio" refers to the value that is acquired by dividing the input revolution speed of a V-belt-type continuously-variable transmission (hereinafter referred to as "continuously-variable transmission") by the output revolution speed. With a continuously-variable transmission, lower speed ratios are nearer the high side.

Figure 1:
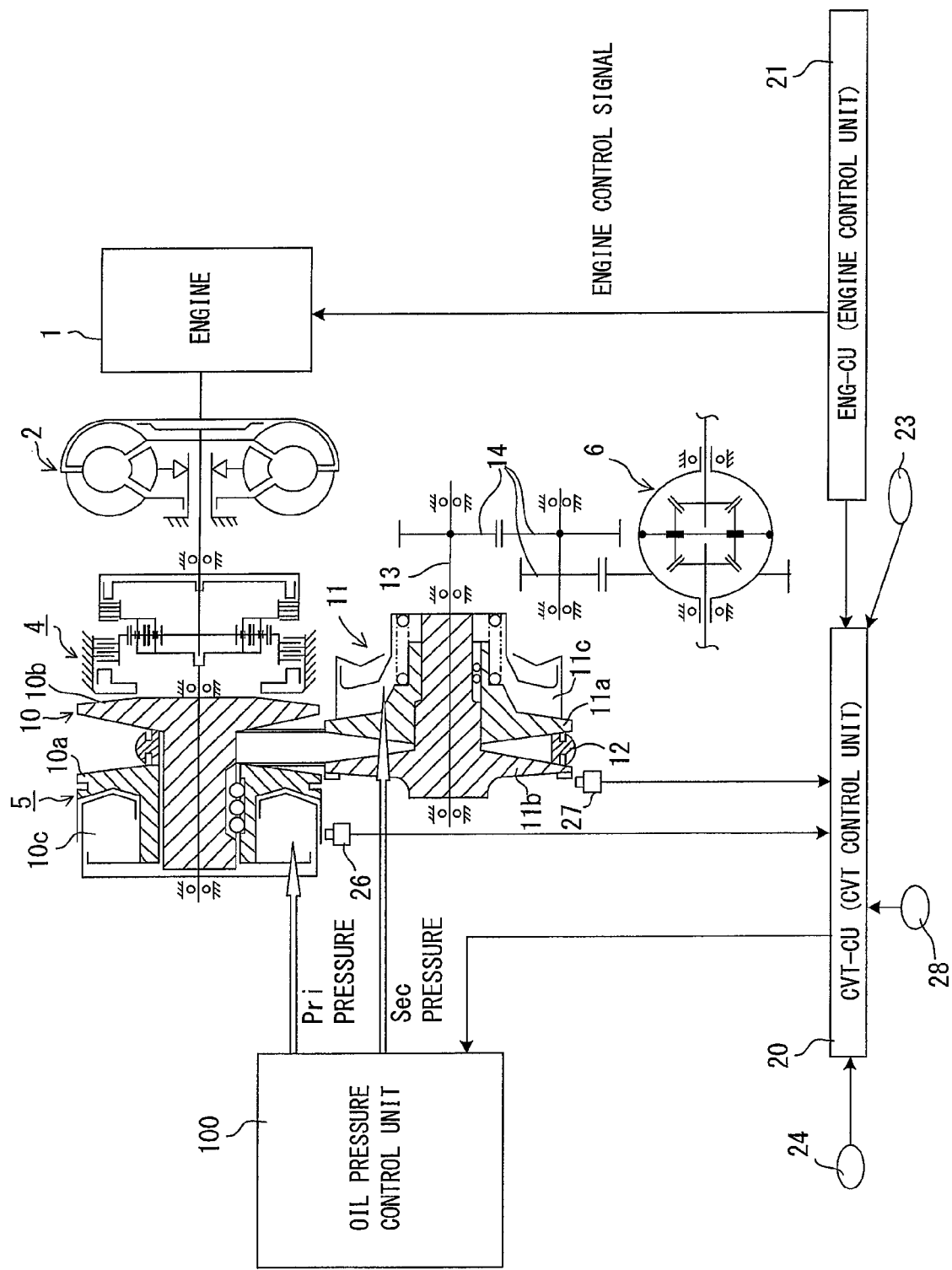
FIG. 1 is a schematic configuration diagram of the V-belt-type continuously-variable transmission of the present embodiment.
Figure 2:
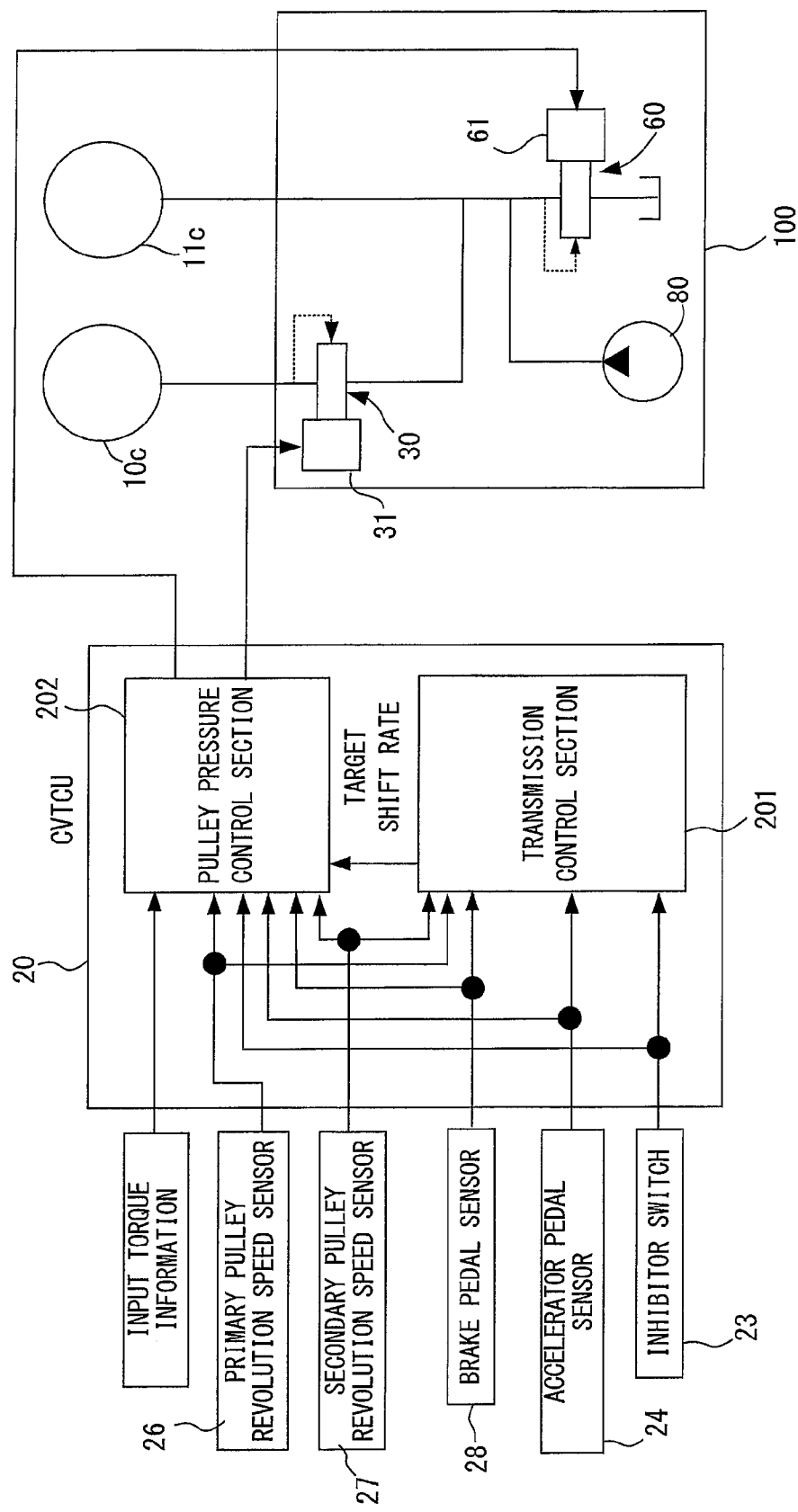
FIG. 2 is a schematic configuration diagram of the oil pressure control unit and the CVT control unit of the present embodiment.

FIG. 1 shows a schematic configuration diagram of a continuously-variable transmission, and FIG. 2 shows a conceptual diagram of an oil pressure control unit and a CVT control unit.

A continuously-variable transmission 5 is connected with an engine 1 via a torque converter 2 with a lockup clutch, and a forward-reverse switching mechanism 4. The continuously-variable transmission 5 has a primary pulley 10, to which driving force is transmitted from the engine 1, a secondary pulley 11, which is connected with an output shaft 13, and a V-belt 12, which is mounted between the primary pulley 10 and the secondary pulley 11. The output shaft 13 is connected with a differential 6 via an idler gear 14 and an idler shaft.

The primary pulley 10 has a fixed conical plate 10b, which, combined as one with an input shaft and rotates, and a mobile conical plate 10a, which is placed opposite the fixed conical plate 10b and forms a pulley groove in the shape of the letter V. The mobile conical plate 10a is displaced in an axial direction as the primary pulley pressure is supplied to and discharged from a primary pulley cylinder chamber 10c.

The secondary pulley 11 has a fixed conical plate 11b, which, combined as one with an output shaft 13 and rotates, and a mobile conical plate 11a, which is placed opposite a fixed conical plate 11b and forms a pulley groove in the shape of the letter V. The mobile conical plate 11a is displaced in the axial direction as a secondary pulley pressure is supplied to and discharged from a secondary pulley cylinder chamber 11c.

The continuously-variable transmission 5 shifts by changing the balance between the primary pulley pressure and the secondary pulley pressure. Given the state in which the speed ratio is maintained, if the primary pulley pressure is lowered without changing the secondary pulley pressure, the continuously-variable transmission 5 shifts down, and, if the primary pulley pressure is increased without changing the secondary pulley pressure, the continuously-variable transmission 5 shifts up.

The continuously-variable transmission 5 is structured such that the pressure receiving area on the mobile conical plate 10a of the primary pulley 10 is larger than the pressure receiving area on the mobile conical plate 11a of the secondary pulley 11. Consequently, when the primary pulley pressure and the secondary pulley pressure are equal, the thrust of the mobile conical plate 10a of the primary pulley 10 is greater than the thrust of the mobile conical plate 11a of the secondary pulley 11.

The speed ratio of the continuously-variable transmission 5 and the thrusts of the pulleys 10 and 11 are controlled by an oil pressure control unit 100 that operates in response to commands from a CVT control unit 20. The CVT control unit 20 determines and controls the target speed ratio and thrusts based on engine output torque information from an engine control unit 21 controlling the engine 1, outputs from sensors, and so on, which will be described later.

The drive torque produced in the engine 1 is input into the primary pulley 10 of the continuously-variable transmission 5 via a torque converter 2 and a forward-reverse switching mechanism 4, and transmitted from the primary pulley 10 to the secondary pulley 11 via the V-belt 12. By displacing the mobile conical plate 10a of the primary pulley 10 and the mobile conical plate 11a of the secondary pulley 11 in axial direction and changing the contact radius between the primary pulley 10 and the V-belt 12 and between the secondary pulley 11 and the V-belt 12, the speed ratios in the primary pulley 10 and the secondary pulley 11 are changed on a continuous basis.

The speed ratio of the continuously-variable transmission 5 and the contact friction force of the V-belt 12 are controlled by the oil pressure control unit 100.

As shown in FIG. 2, the oil pressure control unit 100 has a regulator valve 60, which controls the line pressure, and a pressure reducing valve 30, which controls the primary pulley pressure.

The regulator valve 60 has a solenoid 61, which adjusts the pressure of oil discharged from an oil pressure pump 80, to which part of the drive torque produced in the engine 1 is transmitted and which operates on this drive torque. The regulator valve 60 adjusts the pressure of oil discharged from the oil pressure pump 80 to a predetermined line pressure to match the state of operation, in accordance with commands from the CVT control unit 20 (for example, the duty signal and so on). The line pressure is supplied to and discharged from the secondary pulley cylinder chamber 11c as a secondary pulley pressure.

The pressure reducing valve 30 has a solenoid 31, which adjusts the line pressure. The pressure reducing valve 30 adjusts the line pressure to a predetermined primary pulley pressure to match the state of operation, in accordance with commands from the CVT control unit 20 (for example, the duty signal and so on). The primary pulley pressure is supplied to and discharged from the primary pulley cylinder chamber 10c.

With the present embodiment, no primary pulley pressure sensor is provided, and the line pressure is equal to the secondary pulley pressure, and the actual pressure of the primary pulley pressure never becomes higher than the actual pressure of the secondary pulley pressure (line pressure). The following description will assume that the line pressure is the secondary pulley pressure.

The CVT control unit 20 has a transmission control section 201 and a pulley pressure control section 202.

The transmission control section 201 calculates the target speed ratio and the target shift rate based on the signal from a primary pulley revolution speed sensor 26, the signal from a secondary pulley revolution speed sensor 27, the signal from an accelerator pedal sensor 24, the signal from a brake pedal sensor 28, the signal from the inhibitor switch 23 and so on.

The pulley pressure control section 202 controls the thrust of the primary pulley 10 and the thrust of the secondary pulley 11 based on engine output torque information, target shift rate information, the signal from the primary pulley revolution speed sensor 26, the signal from the secondary pulley revolution speed sensor 27, the signal from the accelerator pedal sensor 24, the signal from the brake pedal sensor 28, the signal from the inhibitor switch 23 and so on. That is, the pulley pressure control section 202 calculates the indicated pressure of the secondary pulley pressure based on the above signals and so on, controls the actual pressure of the secondary pulley pressure by driving the solenoid 61 of the regulator valve 60, and furthermore calculates the indicated pressure of the primary pulley pressure, drives the solenoid 31 of the pressure reducing valve 30 and controls the primary pulley pressure.

When a shift error occurs during an up shift, the CVT control unit 20 secures the differential thrust between the primary pulley 10 and the secondary pulley 11, and controls the oil pressure to increase the secondary pulley pressure, in order to achieve the target speed ratio. A "shift error" here refers to a case where the indicated pressure of the primary pulley pressure becomes equal to the secondary pressure during an up shift, and where the target shift rate is lower than a predetermined shift rate and the actual speed ratio does not achieve the target speed ratio. A shift error occurs in the continuously-variable transmission 5 where, for example, the indicated pressure of the primary pulley pressure and the actual pressure of the primary pulley pressure do not match due to the variation of oil pressure.

Although an up shift is made by increasing the primary pulley pressure, given that the primary pulley pressure is generated by reducing the line pressure, the actual pressure of the primary pulley pressure never becomes higher than the actual pressure of the secondary pulley pressure (line pressure). Consequently, when the indicated pressure of the primary pulley pressure and the actual pressure of the secondary pulley pressure become nearly equal and furthermore a shift error occurs as a result of this, it is necessary to increase the secondary pulley pressure in order to secure the differential thrust between the primary pulley 10 and the secondary pulley 11.

For example, with a continuously-variable transmission 5 that is configured such that the speed ratio becomes the highest when the indicated pressure of the primary pulley pressure and the actual pressure of the secondary pulley pressure become equal, if the actual pressure of the primary pulley 10 and the indicated pressure of the primary pulley pressure are equal, that is, if variation of the oil pressure does not occur, the speed ratio becomes the highest when the indicated pressure of the primary pulley pressure becomes equal to the indicated pressure of the secondary pulley pressure. On the other hand, with a continuously-variable transmission 5 in which the actual pressure of the primary pulley pressure is lower than the indicated pressure of the primary pulley pressure due to variation of oil pressure, when shift error occurs, the differential thrust between the primary pulley 10 and the secondary pulley 11 is secured, and the speed ratio is made the highest by increasing the secondary pulley pressure.

A continuously-variable transmission with a primary pulley pressure sensor detects the actual pressure of the primary pulley pressure with the primary pulley pressure sensor, and, when the target speed ratio is the highest, the actual speed ratio has not reached the target speed ratio, and the actual pressure of the primary pulley pressure is low compared to the actual pressure of the secondary pulley pressure, raises the primary pulley indicated pressure without raising the secondary pulley pressure, so that, by making the actual pressure of the primary pulley pressure equal to the actual pressure of the secondary pulley pressure, it is possible to prevent shift errors and still allow an upshift.

However, with the present embodiment, a primary pulley pressure sensor is not provided, and therefore it is not possible to detect the actual pressure of the primary pulley pressure. Thus, with the present embodiment, the oil pressure control described below is executed.

Figure 3:
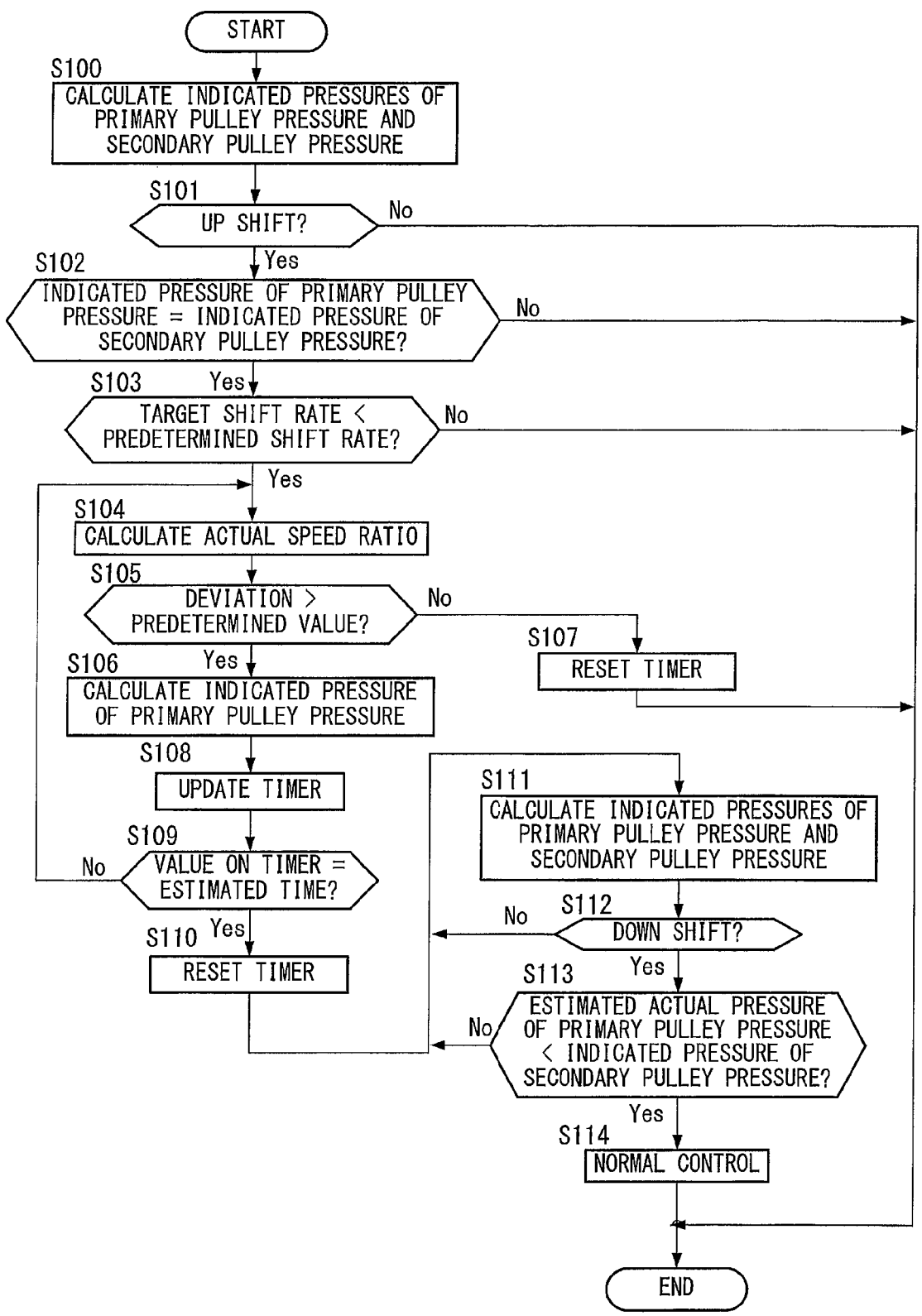
FIG. 3 is a flowchart to explain the oil pressure control of the present embodiment.

FIG. 3 is a flowchart to explain the oil pressure control according to the present embodiment.

In step S100, the CVT control unit 20 calculates the target speed ratio and the target shift rate, calculates the indicated pressure of the primary pulley pressure and the indicated pressure of the secondary pulley pressure based on the target speed ratio and the target shift rate, and shifts.

In step S101, the CVT control unit 20 decides whether or not the shift is an up shift, based on the target shift rate. The CVT control unit 20 moves on to step S102 when the shift is an up shift, or finishes this control when the shift is a down shift or when no shift is made. The target shift rate is a positive value when the shift is an up shift, and is a negative value when the shift is a down shift.

In step S102, the CVT control unit 20 decides whether or not the indicated pressure of the primary pulley pressure is equal to the indicated pressure of the secondary pulley pressure. The CVT control unit 20 moves on to step S103 when the indicated pressure of the primary pulley pressure is equal to the indicated pressure of the secondary pulley pressure, or finishes this control when the indicated pressure of the primary pulley pressure is not equal to the indicated pressure of the secondary pulley pressure.

In step S103, the CVT control unit 20 compares the target shift rate and a predetermined shift rate, and decides whether the target shift rate is lower than a predetermined shift rate. The CVT control unit 20 moves on to step S104 when the target shift rate is lower than the predetermined shift rate, or finishes this control when the target shift rate is equal to or higher than the predetermined shift rate. The greater the target shift rate, the more quickly the continuously-variable transmission 5 shifts to the high side. The predetermined shift rate is a shift rate to allow deciding whether the continuously-variable transmission 5 is making a quick shift, and is set in advance. The CVT control unit 20 decides that the continuously-variable transmission 5 is not making a quick shift when the target shift rate is lower than the predetermined shift rate.

In step S104, the CVT control unit 20 calculates the actual speed ratio based on the signal from the primary pulley revolution speed sensor 26 and the signal from the secondary pulley revolution speed sensor 27.

In step S105, the CVT control unit 20 calculates the deviation between the actual speed ratio and the target speed ratio, and decides whether the deviation is greater than a predetermined value. The CVT control unit 20 moves on to step S106 when the deviation is greater than the predetermined value, or moves on to step S107 when the deviation is equal to or lower than the predetermined value. The predetermined value is a value to allow deciding that the actual speed ratio has achieved the target speed ratio, and is set in advance.

In step S107, the CVT control unit 20 resets the timer, which will be described later in detail.

In step S106, the CVT control unit 20 calculates the indicated pressure of the primary pulley pressure anew, and shifts. The CVT control unit 20 makes the indicated pressure of the primary pulley pressure higher than the indicated pressure of the secondary pulley pressure.

In step S108, the CVT control unit 20 updates the timer. The CVT control unit 20 adds 1 to the present value on the timer. Note that the value on the timer is set to 0 as the initial value, and returns to zero when re-set.

Figure 4:
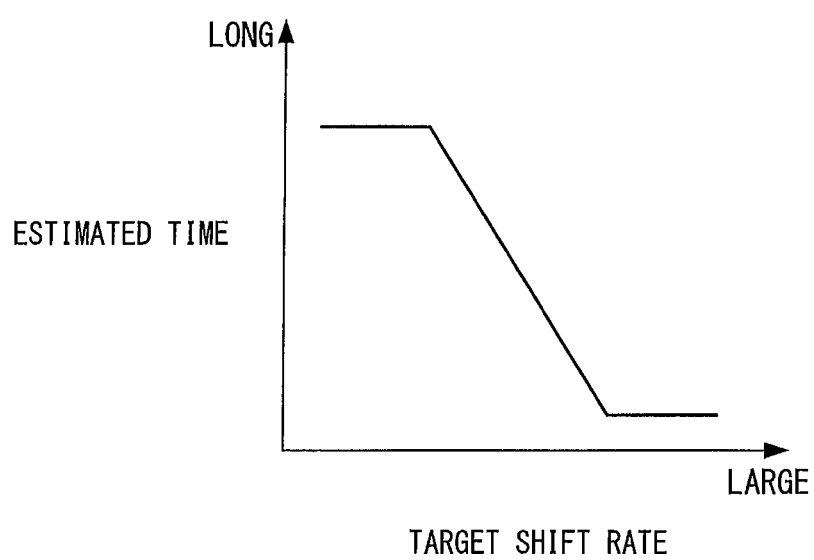
FIG. 4 is a map to show the relationship between the target shift rate and a second predetermined value.

In step S109, the CVT control unit 20 compares the timer value and an estimated time (predetermined time). When the timer value becomes the estimated time, the CVT control unit 20 moves on to step S110. When the value on the timer has not reached the estimated time, the CVT control unit 20 returns to step S104 and repeats the above control. The estimated time is a time where, even with a continuously-variable transmission 5 in which the actual pressure of the primary pulley pressure is lower than the indicated pressure of the primary pulley pressure due to variation of oil pressure, the actual pressure of the primary pulley pressure is assumed to become equal to the actual pressure of the secondary pulley pressure by making the indicated pressure of the primary pulley pressure higher than the indicated pressure of the secondary pulley pressure. The estimated time is calculated from the map shown in FIG. 4. FIG. 4 is a map to show the relationship between the target shift rate and the estimated time, and the estimated time becomes shorter as the target shift rate becomes greater.

When an up shift is in progress and the target shift rate is lower than a predetermined shift rate and the target shift rate is comparatively high, the time the primary pulley pressure takes to reach the actual pressure of the secondary pulley pressure is comparatively short. When the estimated time is made long while the shift rate is comparatively high, the primary pulley pressure becomes equal to the actual pressure of the secondary pulley pressure, and, when it is necessary to make a shift by increasing the secondary pulley pressure, even after the primary pulley pressure has become equal to the actual pressure of the secondary pulley pressure, the secondary pulley pressure does not rise until the estimated time is over. That is, even though the primary pulley pressure has become equal to the actual pressure of the secondary pulley pressure, the secondary pulley pressure does not rise until the estimated time is over, the time it takes until the speed ratio to reach the target speed ratio becomes long, and there is a threat of making the driver feel uncomfortable. Consequently, when an up shift is in progress and the target shift rate is high, the estimated time is made shorter.

On the other hand, when an up shift is in progress and the target shift rate is lower than the predetermined shift rate and the target shift rate is comparatively low, the time it takes the primary pulley pressure to reach the actual pressure of the secondary pulley pressure is comparatively long, and, even if the estimated time is made longer, the primary pulley pressure is little likely to increase until a shift error is detected. Consequently, when an up shift is in progress and the target shift rate is low, the estimated time is made longer.

Even when it is decided in step S103 that a quick shift is not made, if the deviation between the target speed ratio and the actual speed ratio is greater than a predetermined value and that state continues for the estimated time, the CVT control unit 20 decides that a shift error is going occurs.

In step S110, the CVT control unit 20 re-sets the timer.

For example, a continuously-variable transmission 5, in which the actual pressure of the primary pulley pressure is low compared with the indicated pressure of the primary pulley pressure due to variation of oil pressure, may experience cases where, even when the indicated pressure of the primary pulley pressure reaches the indicated pressure of the secondary pulley pressure, the actual pressure of the primary pulley pressure does not rise up to the indicated pressure of the primary pulley pressure, and therefore a shift error occurs. In such a continuously-variable transmission 5, first, in step S106, the CVT control unit 20 makes the indicated pressure of the primary pulley pressure higher than the indicated pressure of the secondary pulley pressure, thereby raising the primary pulley pressure up to the actual pressure of the secondary pulley pressure. That is, without raising the actual pressure of the secondary pulley pressure, the primary pulley pressure is raised up to the actual pressure of the secondary pulley pressure. Then, when the primary pulley pressure increases up to the actual pressure of the secondary pulley pressure and yet a shift error still occurs and the actual speed ratio does not reach the target speed ratio, the CVT control unit 20 executes the control that will be described with respect to step S111 and later steps.

In step S111, the CVT control unit 20 calculates the indicated pressure of the primary pulley pressure and the indicated pressure of the secondary pulley pressure, and shifts. The indicated pressure of the primary pulley pressure is set to the value adding the deviation between the indicated pressure of the primary pulley pressure and the indicated pressure of the secondary pulley pressure at the time the timer value reaches the estimated time, to the indicated pressure of the secondary pulley pressure. Between the indicated pressure of the primary pulley pressure and the indicated pressure of the secondary pulley pressure, the indicated pressure of the primary pulley pressure is higher than the indicated pressure of the secondary pulley pressure, and control is executed while maintaining the deviation between the indicated pressure of the primary pulley pressure and the indicated pressure of the secondary pulley pressure as of the time the value on the timer reaches the estimated time.

In step S112, the CVT control unit 20 decides whether or not the shift in the continuously-variable transmission 5 is a down shift. The CVT control unit 20 moves on to step S113 when the shift is a down shift, or returns to step S111 when the shift is not a down shift.

In step S113, the CVT control unit 20 compares the primary pulley pressure, which is estimated by subtracting the deviation between the indicated pressure of the primary pulley pressure and the indicated pressure of the secondary pulley pressure as of the time the value on the timer reaches the estimated time from the indicated pressure of the primary pulley pressure, and the indicated pressure of the secondary pulley pressure, and moves on to step S114 when the estimated primary pulley pressure is lower than the indicated pressure of the secondary pulley pressure, or returns to step S111 and repeats the above control when the estimated primary pulley pressure is equal to or higher than the indicated pressure of the secondary pulley pressure.

In step S114, the CVT control unit 20 finishes the control of step S111 and later steps, and executes the normal control.

Figure 5:
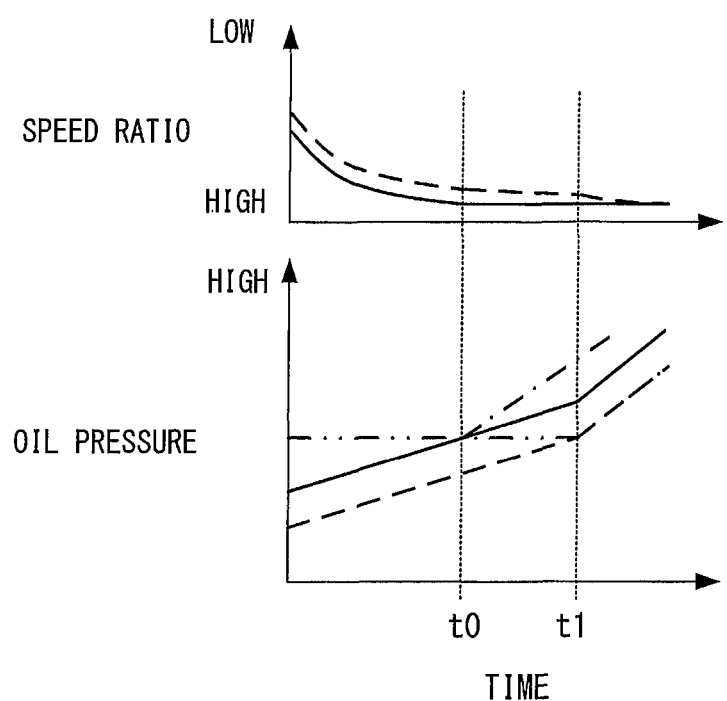
FIG. 5 is a time chart to show changes of the secondary pulley pressure, the primary pulley pressure and so on, when the oil pressure control of the present embodiment is executed.

Next, changes of the secondary pulley pressure, the primary pulley pressure and so on when the oil pressure control according to the present embodiment is executed will be described using the time chart of FIG. 5. Here, assume that a continuously-variable transmission 5 in which the actual pressure of the primary pulley pressure is lower than the indicated pressure of the primary pulley pressure due to variation of oil pressure, is making an up shift. In FIG. 5, the solid line represents the indicated pressure of the primary pulley pressure, the broken line represents the estimated pressure of the primary pulley pressure, the two-dot chain line represents the indicated pressure of the secondary pulley pressure, and the one-dot chain line represents part of the indicated pressure of the secondary pulley pressure when the oil pressure control of the present embodiment is not used. Also, in FIG. 5, the solid line represents the target speed ratio, and the broken line represents the actual speed ratio. Assume that the actual pressure of the secondary pulley pressure follows the indicated pressure of the secondary pulley pressure without causing variation of oil pressure.

During an up shift, the speed ratio is changed to the high side by increasing the indicated pressure of the primary pulley pressure.

At time t0, the indicated pressure of the primary pulley pressure becomes equal to the indicated pressure of the secondary pulley pressure. However, since the estimated pressure of the primary pulley pressure is lower than the indicated pressure of the primary pulley pressure, the estimated pressure of the primary pulley pressure is lower than the actual pressure of the secondary pulley pressure, and the actual speed ratio does not achieve the target speed ratio.

A continuously-variable transmission not using the present embodiment determines a shift error when, at time t0, the indicated pressure of the primary pulley pressure becomes equal to the indicated pressure of the secondary pulley pressure, and the actual speed ratio does not achieve the target speed ratio. After a shift error is determined, the continuously-variable transmission decides that the indicated pressure of the secondary pulley pressure needs to be raised in order to make the actual speed ratio the target speed ratio, and raises the indicated pressure of the secondary pulley pressure. However, at time t0, the estimated pressure of the primary pulley pressure is lower than the indicated pressure of the secondary pulley pressure, and therefore the estimated pressure of the primary pulley pressure can be raised by raising the indicated pressure of the primary pulley pressure. That is, a continuously-variable transmission that does not use the present embodiment raises the secondary pulley pressure despite the fact that the continuously-variable transmission is able to raise the estimated pressure of the primary pulley pressure without raising the secondary pulley pressure. In order to raise the secondary pulley pressure, the discharge pressure of the oil pressure pump needs to be raised. Since the oil pressure pump operates on part of the drive torque generated in the engine and transmitted to the oil pressure pump, a continuously-variable transmission not using the present embodiment places increased load on the engine, and decreases fuel economy.

The continuously-variable transmission 5 of the present embodiment does not raise the secondary pulley pressure and raises the indicated pressure of the primary pulley pressure, until time t1, at which the estimated pressure of the primary pulley pressure becomes the actual pressure of the secondary pulley 11. Consequently, compared to a continuously-variable transmission not using the present embodiment, it is possible to improve the fuel economy of the engine 1.

Also, at time t1, when a shift error is determined, by raising the secondary pulley pressure while maintaining a predetermined deviation with the primary pulley pressure, the secondary pulley pressure and the primary pulley pressure increase, so that the differential thrust between the primary pulley 10 and the secondary pulley 11 is secured, and the speed ratio is changed to the high side.

Advantages of the present invention will be described.

With a continuously-variable transmission 5 that generates a primary pulley pressure by reducing a line pressure (secondary pulley pressure), when the actual pressure of the primary pulley pressure is lower than the indicated pressure of the primary pulley pressure due to variation of oil pressure, the actual pressure of the primary pulley pressure may be insufficient and result in cases where the actual speed ratio cannot be made the target speed ratio. For example, when the indicated pressure of the primary pulley pressure and the indicated pressure of the secondary pulley pressure are equal, a continuously-variable transmission that is configured to make the speed ratio the highest is nevertheless unable to make the speed ratio the highest.

By contrast with this, a continuously-variable transmission with a primary pulley pressure sensor raises the indicated pressure of the primary pulley pressure so that the actual pressure of the primary pulley pressure becomes a primary pulley pressure to achieve the target speed ratio, thereby preventing the actual pressure of the primary pulley pressure from being insufficient and making the actual speed ratio the target speed ratio. However, a continuously-variable transmission without a primary pulley pressure sensor cannot use the above method.

Thus, with the present embodiment, when the indicated pressure of the primary pulley pressure achieves the indicated pressure of the secondary pulley pressure, the target shift rate is lower than a predetermined shift rate, and the actual speed ratio of the continuously-variable transmission 5 has not achieved the target speed ratio, the indicated pressure of the primary pulley pressure is made higher than the indicated pressure of the secondary pulley pressure (line pressure) for an estimated time. After that, it is decided that the primary pulley pressure has become equal to the secondary pulley pressure, and the secondary pulley pressure is changed while maintaining the deviation between the indicated pressure of the primary pressure and the indicated pressure of the secondary pulley pressure after the estimated time is over. By this means, even a continuously-variable transmission 5 which does not have a primary pulley pressure sensor and in which the actual pressure of the primary pulley pressure is lower than the indicated pressure of the primary pulley pressure due to variation of oil pressure is able to raise the primary pulley pressure up to the secondary pulley pressure, and is able to make the actual speed ratio the target speed ratio by changing the secondary pulley pressure while maintaining the deviation between the indicated pressure of the primary pulley pressure and the indicated pressure of the secondary pulley pressure after an estimated time is over.

Also, it is equally possible not to use the present embodiment, and when the actual speed ratio of the continuously-variable transmission has not achieved the target speed ratio after the indicated pressure of the primary pulley pressure achieves the indicated pressure of the secondary pulley pressure, achieve the target speed ratio by raising the indicated pressure of the secondary pulley pressure alone and raising the primary pulley pressure at the same time. However, if the primary pulley pressure is lower than the indicated pressure of the primary pulley pressure due to variation of oil pressure, the secondary pulley pressure is raised despite the fact that primary pulley pressure can be raised without raising the secondary pulley pressure, and therefore the oil pressure pump needs to discharge a high secondary pulley pressure and the engine needs to produce greater drive force, which decreases the fuel economy.

By contrast with this, when it is assumed that there is a deviation between the actual pressure of the primary pulley pressure and the indicated pressure of the primary pulley pressure, the continuously-variable transmission 5 of the present embodiment raises the indicated pressure of the primary pulley pressure, without raising the secondary pulley pressure, and raises the primary pulley pressure alone. Consequently, it is possible to prevent the secondary pulley pressure from rising unnecessarily, and improve the fuel economy of the engine 1.

When the indicated pressure of the primary pulley pressure is made higher than secondary pulley pressure for an estimated time and still a shift error occurs, the deviation between the indicated pressure of the primary pulley pressure and the indicated pressure of the secondary pulley pressure as of when the shift error occurs is maintained, and the primary pulley pressure and the secondary pulley pressure are raised. For example, when a shift error occurs and the indicated pressure of the primary pulley pressure is made higher than the indicated pressure of the secondary pulley pressure, the feedback integral terms of the transmission control are accumulated, and, when making a down shift after that, there is a threat of delaying the shift. The continuously-variable transmission 5 of the present embodiment is able to prevent such delay.

By setting the estimated time based on the target shift rate, it is possible to decide whether a shift error occurs based on the operating state of the continuously-variable transmission 5.

The present invention is not limited to the embodiments described above and obviously includes various modifications and improvements which can be made within the scope of the technical concept thereof.

The oil pressure control of the above embodiment may be applied to a continuously-variable transmission that raises the secondary pulley pressure stepwise when the actual pressure of the primary pulley pressure becomes equal to the actual pressure of the secondary pulley pressure. In this case, it is possible to delay the time the secondary pulley pressure rises, and improve the fuel economy of the engine 1.

Although a continuously-variable transmission 5 to make a line pressure be a secondary pulley pressure and make an oil pressure given by reducing the line pressure be a primary pulley pressure has been described with the above embodiment, it is equally possible to use a continuously-variable transmission in which an oil pressure given by reducing the line pressure works as the secondary pulley pressure.

Although the estimated time has been calculated using the map of FIG. 4, it is equally possible to use a fixed value that is provided in advance.

Also, the present invention is also applicable to a vehicle with an electric oil pump, for example, an electric car, so that it is possible to reduce the power consumed by the electric oil pump.

This application claims priority based on Japanese Patent Application No. 2011-271981, filed with the Japan Patent Office, on Dec. 13, 2011, the entire content of which is expressly incorporated herein by reference.

The invention claimed is:

1. A continuously-variable transmission which uses a secondary pulley pressure as a line pressure, and which adjusts the line pressure to a primary pulley pressure, the continuously-variable transmission comprising:
a first determining unit configured to determine whether an indicated pressure of the primary pulley pressure has become the line pressure during an up shift;
a second determining unit configured to determine whether a target shift rate of the continuously-variable transmission has achieved a predetermined shift rate;
an indicated pressure control unit configured to make the indicated pressure of the primary pulley pressure alone higher than the line pressure when the target shift rate is determined to be equal to or lower than the predetermined shift rate by the second determining unit, and, upon deciding whether a speed ratio of the continuously-variable transmission has become a target speed ratio, the speed ratio is determined not to have become the target speed ratio; and
an estimated time detecting unit configured to detect a predetermined time it takes until the primary pulley pressure can be regarded as being equal to the line pressure after the target shift rate is determined to be equal to or lower than the predetermined shift rate by the second determining unit, and the indicated pressure of the primary pulley pressure is made higher than the line pressure by the indicated pressure control unit,
wherein the indicated pressure control unit is configured to calculate a deviation between the indicated pressure of the primary pulley pressure and indicated pressure of the line pressure after the predetermined time detected by the estimated time detecting unit is over, and control transmission of the continuously-variable transmission while maintaining the deviation after the predetermined time is over.

2. The continuously-variable transmission according to claim 1, further comprising a line pressure raising unit configured to raise the line pressure when, during the predetermined time, the speed ratio is changed to a high side, after the indicated pressure of the primary pulley pressure is made higher than the line pressure by the indicated pressure control unit.

3. The continuously-variable transmission according to claim 1, wherein the estimated time detecting unit is configured to estimate the predetermined time based on the target shift rate.

4. The continuously-variable transmission according to claim 1, wherein, when, during the predetermined time, the speed ratio is changed to a high side, after the indicated pressure of the primary pulley pressure is made higher than the line pressure by the indicated pressure control unit, the indicated pressure of the primary pulley pressure and the indicated pressure of the secondary pulley pressure rise while maintaining the deviation between the indicated pressure of the primary pulley pressure and the indicated pressure of the secondary pulley pressure as of a time when the predetermined time is over.

5. A continuously-variable transmission control method to control a continuously-variable transmission which uses a secondary pulley pressure as a line pressure, and which adjusts the line pressure to a primary pulley pressure, the continuously-variable transmission control method comprising:
during an up shift, determining whether an indicated pressure of the primary pulley pressure has become the line pressure;
determining whether a target shift rate of the continuously-variable transmission has achieved a predetermined shift rate;
when the target shift rate is determined to be equal to or lower than the predetermined shift rate, and, upon deciding whether a speed ratio of the continuously-variable transmission has become a target speed ratio, the speed ratio is determined not to have become the target speed ratio, making the indicated pressure of the primary pulley pressure alone higher than the line pressure;
after the target shift rate is determined to be equal to or lower than the predetermined shift rate, and the indicated pressure of the primary pulley pressure is made higher than the line pressure, detecting a predetermined time it takes until the primary pulley pressure can be regarded as being equal to the line pressure;

calculating a deviation between the indicated pressure of the primary pulley pressure and indicated pressure of the line pressure after the predetermined time is over; and after the predetermined time is over, controlling transmission of the continuously-variable transmission while maintaining the deviation.

6. A continuously-variable transmission which uses a secondary pulley pressure as a line pressure, and which adjusts the line pressure to a primary pulley pressure, the continuously-variable transmission comprising:

first determining means for determining whether an indicated pressure of the primary pulley pressure has become the line pressure during an up shift;

second determining means for determining whether a target shift rate of the continuously-variable transmission has achieved a predetermined shift rate;

indicated pressure control means for making the indicated pressure of the primary pulley pressure alone higher than the line pressure when the target shift rate is determined to be equal to or lower than the predetermined shift rate by the second determining means, and, upon deciding whether a speed ratio of the continuously-variable transmission has become a target speed ratio, the speed ratio is determined not to have become the target speed ratio; and estimated time detecting means for detecting a predetermined time it takes until the primary pulley pressure can be regarded as being equal to the line pressure after the target shift rate is determined to be equal to or lower than the predetermined shift rate by the second determining means, and the indicated pressure of the primary pulley pressure is made higher than the line pressure by the indicated pressure control means, wherein the indicated pressure control means is configured to calculate a deviation between the indicated pressure of the primary pulley pressure and indicated pressure of the line pressure after the predetermined time detected by the estimated time detecting means is over, and control transmission of the continuously-variable transmission while maintaining the deviation after the predetermined time is over.

\* \* \* \* \*